Dec. 5, 1967 P. B. FONDEN ET AL 3,356,319
DEVICE FOR BRAKING A LANDING AIRCRAFT
Filed May 18, 1965
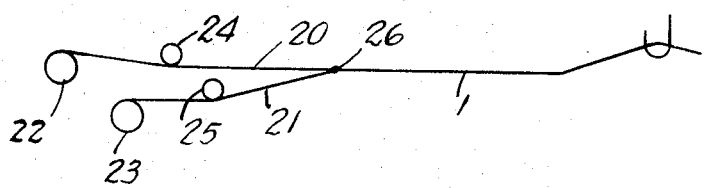
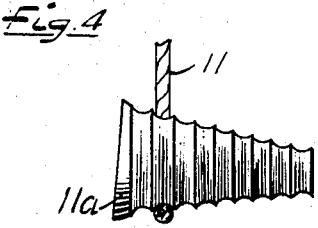
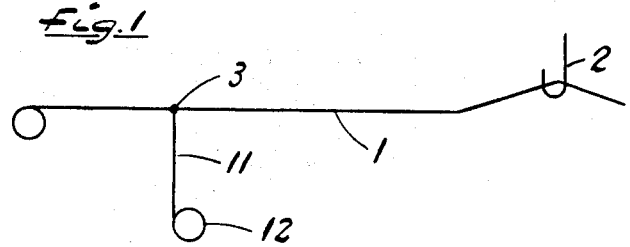
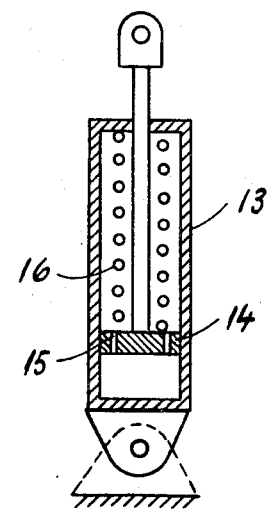
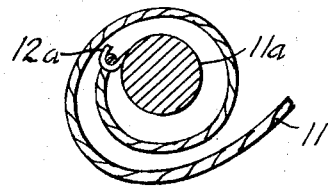
PER BORJE FONDEN and
KARL OVE TORGNY WALANDER
INVENTORS
BY ERIC Y. MUNSON,
Attorney 3,356,319
DEVICE FOR BRAKING A LANDING AIRCRAFT
Per Borje Fonden, Hejdegatan 3, and Karl Ove Torgny
 Walander, Elsa Brandstrom Gata 5, both of Linkoping,
 Sweden
Filed May 18, 1965, Ser. No. 456,685
Claims priority, application Sweden, June 30, 1964,
7,944/64
3 Claims. (Cl. 244—110)

This invention relates to a device for braking an aircraft landing on the ground or on a ship, by means of an arresting device such as is composed of cables, nets or the like, both ends of which are attached to one or more brakes.

When the landing aircraft engages the arresting device at high speed it induces various wave-like motions in the device. One type of motion induced when the aircraft contacts the device, is a transverse wave which is propagated successively to the sides of the cables or not until it reaches the brakes where it becomes reactive and returns toward the aircraft, where it is once more reflected and propagated outwardly. When this wave or undulation reaches the brakes, their rotational speed is increased abruptly and a peak load occurs. Even if this peak load can be avoided by providing the brakes with a relatively low moment of inertia, which however leads to certain complications, the problem is encountered in a more difficult form when the returned wave arrives back at the aircraft. The braking devices are so arranged that at this point an approximately constant force can be expected on the cable, and when the wave or undulation arrives at the aircraft the cable is jerked sharply in a direction toward the rear of the aircraft, thus abruptly increasing the load acting to the rear of the hook (with a cable) or on the aircraft (with a net). It would thus be highly desirable if this transverse wave initiated by the aircraft could be eliminated quickly.

The invention is therefore characterized primarily in that the arresting device or its connection to the brakes is, at a certain distance from the respective brakes, connected to a wave dampener which acts to reflect or return part of the longitudinal wave caused by the aircraft when it is arrested.

The distance between the points of connection and the brake is of the order of one quarter of a wave length. This device causes the wave to be divided into two halves, one of which is advanced so that it is 180° out of phase with the other.

With the objects above set forth and others to be hereinafter disclosed, in view, we have devised the arrangements to be set forth and more particularly pointed out in the claims appended hereto.

In the accompanying drawings, wherein illustrative embodiments of the invention are disclosed, FIGS. 1, 2 and 3 show schematic views of several embodiments of a wave dampener;

FIG. 4 shows a dampener consisting of a frusto-conical grooved drum around which the cable extends, with the drum having a groove of decreasing radius, and FIG. 5 shows the rotatable drum provided with a hook engaged by the cable and from which the cable becomes unhooked.

In the drawings the arresting device is shown as a cable 1 which is adapted to be engaged by a hook 2 on the aircraft. The wave dampener is located on the side of the arresting device from which the aircraft arrives, and is connected to the cable 1 by means of a releasable coupling 3 which is provided with a shear pin which breaks under a certain stress.

The wave dampener is arranged with a connecting cable 11 extending to the arresting cable 1 and which is largely perpendicular to it so as not to hinder the motion occurring as a result of the first longitudinal forces encountered in the cable and thus act first to dampen the transverse motion. FIG. 1 shows that the releasable coupling 3 on cable 1 is joined to the auxiliary brake 12 by means of the cable 11.

The design of the auxiliary brake 12 can be entirely conventional, but since the energy of the wave is, for the most part, proportional to the square of the aircraft speed and the motion of the cable is, for the most part, proportional to the aircraft speed, it is highly desirable that a brake be provided which has a braking force which is approximately proportional to the square of the cable speed. This braking force can be obtained by simply using a hydraulic brake in which the braking force is generated by liquid resistance. FIG. 4 shows a fluid brake with a movable piston 14 provided with passages 15 and positioned in a cylinder 13. A return spring 16 acts on the piston.

Another way to achieve the same effect is shown in FIG. 3. Therein the arresting cable is shown as being divided into two cable sections 20 and 21, each section leading to its own brake 22 and 23 or alternatively, via its own pulley 24 and 25 to its own brake. The distance from the branching point 26 to the pulleys is selected so that the difference between the two points will, in principle, be ¼ of a wave length. The device functions so that the wave is divided up, half on each branch cable, and each half of the wave is reflected at a time interval which enables them to be joined 180° out of phase with each other. That is to say, the wave halves have been arranged so that they counteract each other.

Various combinations of the above devices are conceivable and the embodiments herein shown are all characterized by their ability to reflect only partially a transverse wave being propagated along the arresting cable. These disclosures can only be considered as illustrative examples and do not eliminate other forms of the invention or hybrid forms of those described herein.

In FIG. 4 is shown the cable 11 engaging with a frusto-conical drum 11a having a spiral groove with the groove decreasing in radius to increase the inertial resistance when caused to rotate from the forces in the cable. FIG. 5 shows how the cable 11 after having rotated to a certain extent and for more than one revolution, becomes unhooked from the hook 12a and is thereafter free to follow the cable 11 or the net engaged by the airplane.

In the drawings are shown wave dampeners arranged for a single hook cable. It is a fact that a wave dampener is of special value when the arresting device for the aircraft must necessarily be complicated for one reason or another and is thus given a high mass per unit of length. This depends on the fact that the energy of the wave increases with the mass of the arresting device while the speed of the wave decreases and the wave angles increase. This, in turn, leads to greater changes in the speed of the brakes and greater changes in the angles of the arresting device when the angular wave is reflected back to the aircraft. The wave dampener is therefore especially intended to be used together with assembled arresting equipment such as a net or several hook cables that are combined to assure greater arresting ability.

Having thus described embodiments of the invention, it is obvious that the same is not to be restricted thereto, but is broad enough to come within the scope of the annexed claims.

What we claim is:
1. A device for braking a landing aircraft comprising, a cable or net engaged by the airplane, the cable or net being attached at its opposite ends to brakes, a dampener at each side of the cable or net comprising a line extended angularly to the arresting cable or net, and a rotatable element around which the line is wound, thereby giving inertial resistance to primarily the transverse movement of the cable or net, each dampener being located on the side of the arresting device from which the aircraft arrives.

2. A device according to claim 1 in which the cable around the rotatable element follows a spiral groove therein, with said groove of decreasing radius in order to increase the inertial resistance when brought to rotate from the forces in the cable.

3. A device according to claim 1 in which the cable after having rotated the rotatable element to a certain extent and for more than one revolution, is unhooked from the rotatable element and is thereafter free to follow the cable or net engaged by the airplane.

References Cited

UNITED STATES PATENTS

| | | | |
|---|---|---|---|
| 1,499,472 | 7/1924 | Pratt | 244—110 |
| 2,483,655 | 10/1949 | Schultz | 244—110 |
| 2,977,076 | 3/1961 | Byrne et al. | 244—110 |
| 3,098,629 | 7/1963 | Fonden et al. | 244—110 |
| 3,114,522 | 12/1963 | Mortimer | 244—110 |
| 3,123,325 | 3/1964 | Stephens | 244—110 |
| 3,236,479 | 2/1966 | Nordtorp et al. | 244—110 |

FOREIGN PATENTS

| | | |
|---|---|---|
| 1,222,670 | 1/1960 | France. |
| 569,149 | 4/1945 | Great Britain. |
| 103,508 | 3/1964 | Norway. |

MILTON BUCHLER, *Primary Examiner.*

L. HALL, P. E. SAUBERER, *Assistant Examiners.*